(12) United States Patent
Hirayama et al.

(10) Patent No.: US 7,757,479 B2
(45) Date of Patent: Jul. 20, 2010

(54) SECONDARY AIR SUPPLY SYSTEM FOR AN EXHAUST PORT OF AN ENGINE

(75) Inventors: Shuji Hirayama, Wako (JP); Kenichiro Kakemizu, Wako (JP); Ken Tomiyasu, Wako (JP); Teruhide Yamanishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1123 days.

(21) Appl. No.: 11/238,569

(22) Filed: Sep. 29, 2005

(65) Prior Publication Data

US 2006/0065255 A1 Mar. 30, 2006

(30) Foreign Application Priority Data

Sep. 29, 2004 (JP) .............................. 2004-283413

(51) Int. Cl.
*F01N 3/00* (2006.01)
(52) U.S. Cl. .............................. 60/289; 60/291; 60/293; 60/304; 60/317
(58) Field of Classification Search ................ 123/585, 123/343; 60/282, 287, 289
See application file for complete search history.

(56) References Cited

U.S. PATENT DOCUMENTS

| | | | |
|---|---|---|---|
| 4,476,676 A | | 10/1984 | Ikenoya et al. |
| 5,078,105 A | * | 1/1992 | Ito et al. .................. 123/195 R |
| 5,657,628 A | * | 8/1997 | Takeuchi ...................... 60/293 |
| 6,311,483 B1 | * | 11/2001 | Hori et al. ...................... 60/293 |
| 6,382,197 B1 | * | 5/2002 | Matsumoto .................. 123/585 |
| 2002/0033296 A1 | * | 3/2002 | Ohyama et al. ............. 180/312 |
| 2003/0132837 A1 | * | 7/2003 | Hasegawa et al. ........... 340/440 |
| 2004/0123591 A1 | * | 7/2004 | Yoshida et al. ................ 60/305 |

(Continued)

FOREIGN PATENT DOCUMENTS

DE 103 11 013 A1 10/2003

(Continued)

OTHER PUBLICATIONS

Search Report and Search Opinion issued by the Institut National De La Propriété Industrielle Dec. 11, 2008 in co-pending French patent application No. 05 52795.

(Continued)

*Primary Examiner*—Thomas E Denion
*Assistant Examiner*—Jesse Bogue
(74) *Attorney, Agent, or Firm*—Hamre, Schumann, Mueller & Larson, P.C.

(57) ABSTRACT

A secondary air supply system in which individual members may be arranged to be disposed on substantially the same straight line in an engine, whereby connection path lengths are reduced and the attachment thereof is facilitated. The secondary air supply system may be provided between an air cleaner and attached to an engine and an exhaust port of the engine. The secondary air supply system has a secondary air control valve, a lead valve and secondary air supply paths which connect the air cleaner, the secondary air control valve and the lead valve together and supply air to the exhaust port from the air cleaner. The air cleaner, the secondary air control valve and the lead valve may be arranged to be disposed on substantially the same straight line when viewed from the side.

5 Claims, 6 Drawing Sheets

U.S. PATENT DOCUMENTS

2004/0216726 A1 * 11/2004 Hori et al. .................. 123/699

FOREIGN PATENT DOCUMENTS

| JP | 56-139815 U | 10/1981 |
| --- | --- | --- |
| JP | 59-131721 A | 7/1984 |
| JP | 2000-8850 A | 1/2000 |
| JP | 2000-87738 A | 3/2000 |
| JP | 2002-201935 | 7/2002 |
| JP | 2002-235535 A | 8/2002 |
| JP | 2004-68733 A | 3/2004 |

OTHER PUBLICATIONS

Office action issued Sep. 11, 2009 by the Japanese Patent Office in related Application No. JP 2004-283413.

* cited by examiner

SECONDARY AIR SUPPLY SYSTEM FOR AN EXHAUST PORT OF AN ENGINE

FIELD OF THE INVENTION

The technical disclosure herein relates to a secondary air supply system for supplying air into an exhaust port so that uncombusted components remaining in the exhaust port of an engine may burn again.

BACKGROUND OF THE INVENTION

A secondary air supply system for an engine has been employed as part of the exhaust emission control, and has been used to supply air from an air cleaner to an exhaust port to cause uncombusted components remaining in an exhaust gas to burn again. The secondary air supply system is configured to include a secondary air control valve and a lead valve on a secondary air supply path that connects the air cleaner to the exhaust port. The secondary air control valve is under control of an engine control unit and is opened/closed according to the vehicle speed, the rotational speed of an engine, and the throttle position. In addition, the lead valve is configured to prevent the exhaust gas from flowing back into the air cleaner from the exhaust port, as well as to supply air from the air cleaner to the exhaust port (e.g., see Japanese Patent Laid-Open No. 2002-201935).

However, an air cleaner, a secondary air control valve, and a lead valve typically are arranged at complicated positions in conventional engines. Furthermore, the setting of secondary air supply paths, which connect an air cleaner, a secondary air control valve, and a lead valve with one another, is also complex. Thus, path lengths have been increased making it difficult to connect the secondary air supply paths to an air cleaner, a secondary air control valve, and a lead valve.

SUMMARY OF THE INVENTION

The secondary air supply system disclosed herein has been accomplished in view of these problems. A secondary air supply system is provided in which its individual members may be arranged to be substantially disposed on the same straight line in an engine, whereby the path lengths are reduced and attachment thereof is facilitated.

In order to solve the foregoing problems, the secondary air supply system disclosed herein is provided between an air cleaner attached to an engine and an exhaust port of the engine, the secondary air supply system having a secondary air control valve, a lead valve, and a secondary air supply path which connects the air cleaner, the secondary air control valve and the lead valve together and supplies air to the exhaust port from the air cleaner. When viewed from the side, the air cleaner, the secondary air control valve and the lead valve are preferably arranged to be disposed on substantially the same straight line.

In this configuration, the secondary air supply system provides that the air cleaner, the secondary air control valve, and the lead valve are preferably arranged on one side of the engine along the engine cylinder axis, and are substantially disposed on the same straight line, such as when viewed from the top.

The secondary air supply path preferably lies on the straight line connecting the air cleaner, the secondary air control valve, and the lead valve when viewed from the side.

The secondary air control valve is preferably arranged, when viewed from the side, above a cylinder of the engine and above a cooling air intake path which extends forwardly from the front of a transmission case of the engine.

A cam chain tensioner is preferably arranged on the top surface of the side of the engine cylinder, and the secondary air control valve is preferably arranged to be flanked by the cam chain tensioner.

The secondary air supply system, as configured above, may readily reduce the lengths of the secondary air supply paths, thereby making it possible to render the secondary air supply system compact and lightweight and to reduce the manufacturing cost. Attachment of the secondary air supply paths can be more conveniently performed from one side of the engine, by arranging the air cleaner, the secondary air control valve, and the lead valve on one side of the engine and along the engine cylinder axis, so that they are substantially disposed on the same straight line when viewed from the top. As the secondary air supply paths are also disposed on the straight line and run through the air cleaner, the secondary air control valve, and the lead valve, the lengths of the secondary air supply paths may be reduced, thereby facilitating connection operations.

As the secondary air control valve is arranged, when viewed from the side, above the cylinder of the engine and above the cooling air intake path, the secondary air control valve may be more likely to be exposed to cooling air and thereby the secondary air control valve can be kept at an appropriate temperature. Furthermore, since the secondary air control valve is arranged to be flanked by the cam chain tensioner, heat from the engine can be blocked by the cam chain tensioner, and the secondary air control valve may be maintained at a more appropriate temperature.

DETAILED DESCRIPTION OF THE PREFERRED EMBODIMENT

Figure 1:
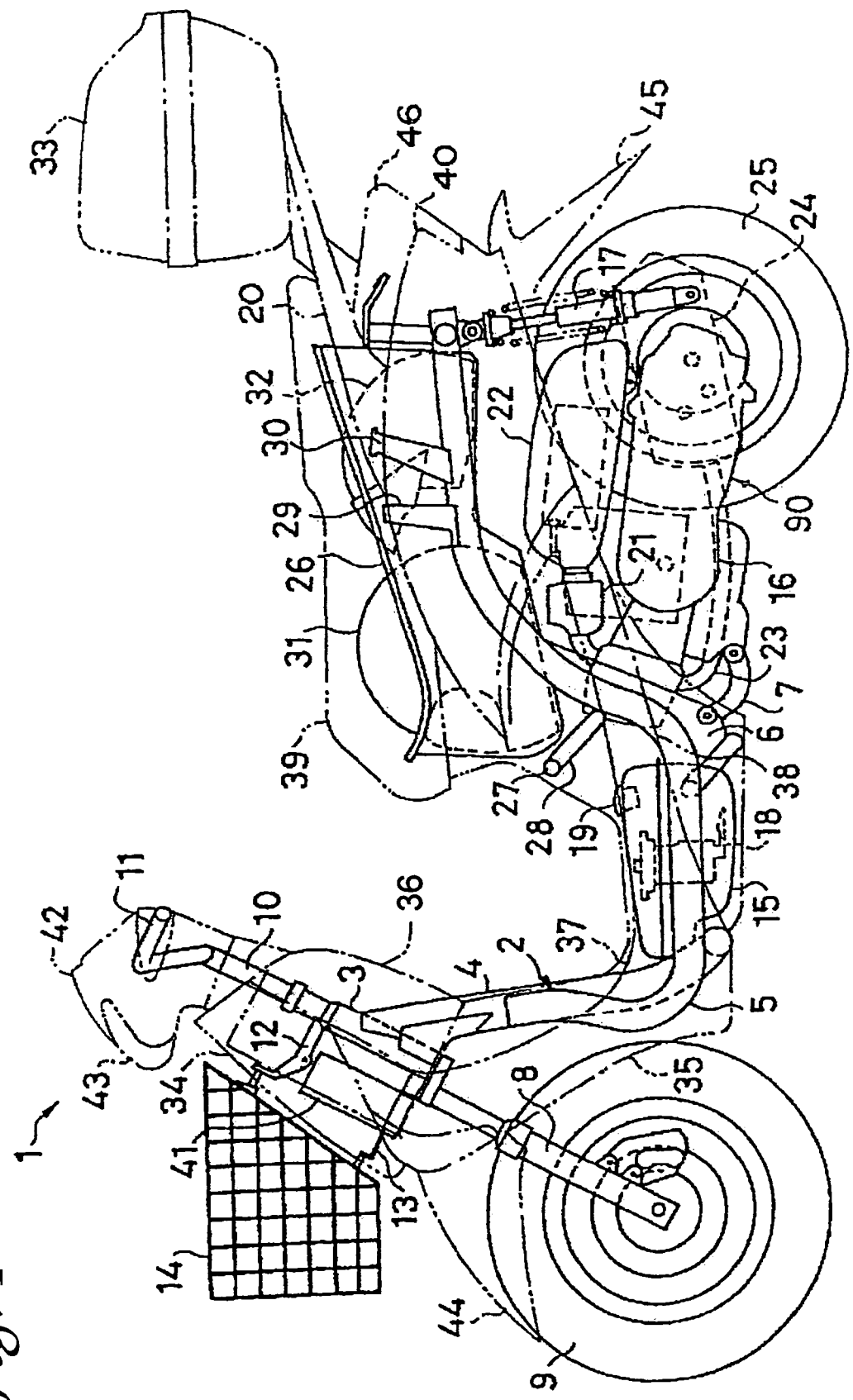
FIG. 1 is a side view of one embodiment of a scooter-type vehicle to which one embodiment of a secondary air supply system is attached.
Figure 2:
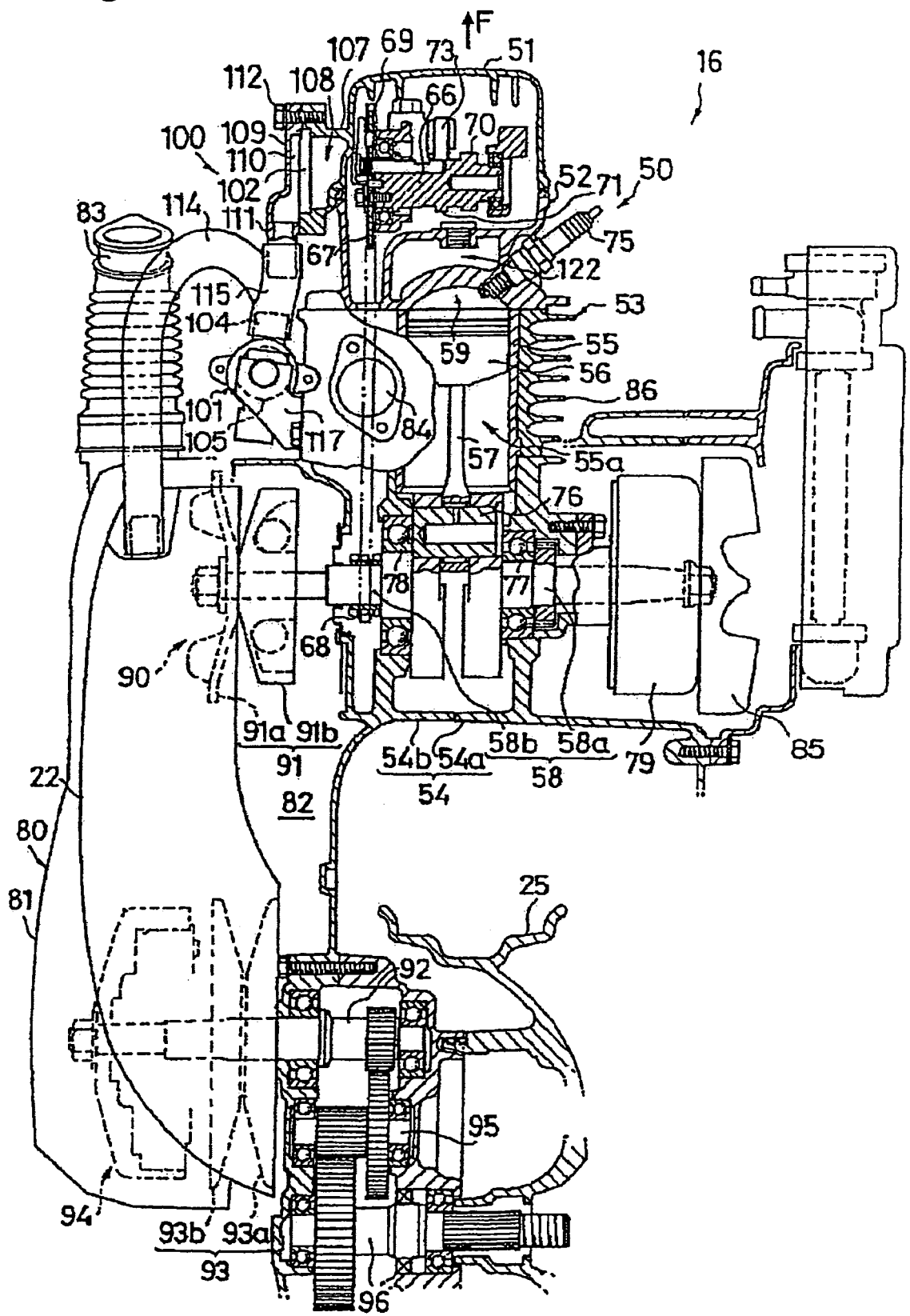
FIG. 2 is a top plan view of a one embodiment of a power unit.

Hereinafter, a preferred embodiment of a secondary air supply system will be described with reference to the drawings. First, a scooter-type vehicle 1 mounted with a secondary air supply system according to the principles of the present invention will be described using FIG. 1. The scooter-type vehicle 1 has a body frame 2. The body frame 2 is constituted of: a head pipe 3 positioned at the front of the body frame 2 and extending in the vertical direction; a down frame 4 extending downward from the head pipe 3; a pair of side frames 5, arranged side by side to extend downward from approximately the center of the down frame 4, extend in the rearward direction and then extend obliquely upward in the rearward direction; and an arc-shaped curved frame 7 attached to these side frames 5 by a side plate 6.

The head pipe 3 has a steering shaft (not shown) rotatably attached within the head pipe 3. The steering shaft may have a lower end attached to a front fork 8, and a front wheel 9 is movably supported by the lower end of the front fork 8. Meanwhile, the steering shaft may have an upper end attached to a handle post 10 and the handle post 10 has the upper end attached to a handle bar 11, whereby the front wheel 9 can be steered upon operation of the handle bar 11. In addition, upper and lower stays 12 and 13 are attached to the head pipe 3 to extend forwardly. A front basket 14 is attached to respective front ends of the upper and lower stays 12 and 13.

A fuel tank 15 is disposed between the pair of side frames 5 at a lower part of the fuel tank 15. The curved frame 7, located behind the fuel tank 15 in a rearward direction, has a rear end where the front end of a power unit 16 is attached so as to be swingable up and down. Additionally, a rear end of the power unit 16 is attached to a rear end of one of the side frames 5 with a rear cushion unit 17. Here, the fuel tank 15 is provided with a fuel pump 18 which includes a rollover sensor therein, and is configured to be capable of receiving a fuel from a fill opening (cap) 19 that is provided in an upper portion of the fuel tank 15. Moreover, the power unit 16 is constituted of an engine 50, a transmission 90, a throttle body 21, an air cleaner 22, an exhaust pipe 23 extending in the rearward direction from the engine 50, and a muffler 24 connected to the rear end of the exhaust pipe 23. A rear wheel 25 is attached to the rear end of the power unit 16. The power unit 16 drives the rear wheel 25. In this way the scooter-type vehicle 1 is configured to receive power for driving.

A luggage box 26 and grab rail 20 are attached to the rear of the side frames 5. The front of the luggage box 26 is supported by a front side-cross pipe 27 attached to the side frames 5 and a front side plate 28, whereas the rear of the luggage box 26 is supported by a portal frame 29 attached to the side frames 5. Moreover, the grab rail 20 is supported by rear stays 30 respectively extending upward from the side frames 5. Here, helmets 31 and 32 are shown housed in the luggage box 26. Moreover, a rear housing box 33 is attached to the rear of the grab rail 20.

The front upper portion of the scooter-type vehicle 1 is covered with a front cover 34. A pair of front side covers 35, arranged side by side, is attached to the lower side of the front cover 34. A turn signal lamp (not shown) may be attached to each front side cover 35. A front inner cover 36 is attached to the rear of the front cover 34. The sides of a step floor 37, on which a rider and a pillion passenger rest their feet, are covered with the side covers 35 and an under cover 38. Moreover, a seat 39 is attached to the upper portion of the luggage box 26, and a body cover 40 covers the side and the lower portion of the seat 39. Furthermore, a handle bar cover 42 is attached to the upper portion of the front cover 34 for covering the handle bar 11, and a head lamp 43 is attached to the handle bar cover 42. A front fender 44 is attached in a way that it covers the upper portion of the front wheel 9, and a rear fender 45 is attached in a way that it covers the upper portion of the rear wheel 25.

Incidentally, a tail lamp 46 is arranged below the grab rail 20, and a battery 41 is contained between the front cover 34 and the front inner cover 36.

Next, the power unit 16 will be described in detail using FIGS. 2 to 5. It should be noted that, in this embodiment, the arrow F in FIG. 2 points to the front direction and the arrow U in FIG. 3 points to the upper direction. The engine 50 constituting the power unit 16 is constituted of a cylinder head cover 51, a cylinder head 52, a cylinder block 53 and a crankcase 54. A piston 56 is arranged so as to be slidable up and down in a cylinder chamber 55a, the cylinder chamber 55a being surrounded by a cylinder sleeve 55, which is fitted into the cylinder block 53. The piston 56 is connected to a crankshaft 58 by a connecting rod 57, and is rotatably held inside the crankcase 54. Through an inlet and an outlet, an inlet port 60 and an exhaust port 61 respectively communicate with a combustion chamber 59, which is constituted of the cylinder block 53 (cylinder sleeve 55), the cylinder head 52, and the piston 56. A mushroom-shaped inlet valve 62 and a mushroom-shaped outlet valve 63 are respectively spring-biased by valve springs 64 and 65 in a direction that the inlet and outlet are closed all the time. Each of the valve springs 64 and 65 has one end which is attached to its respective valve on a valve shaft and supported by a retainer, and the other end is supported by the cylinder head 52.

Furthermore, a cam shaft 66 is rotatably connected to the cylinder head 52 for opening/closing the inlet valve 62 and the outlet valve 63. A timing chain 69 is wound around both a cam driven sprocket 67 provided to the cam shaft 66 and a cam drive sprocket 68 provided to the crankshaft 58. Thus, the cam shaft 66 rotates in accordance with the rotation of the crankshaft 58, and cams 70 and 71 formed on the cam shaft 66 push down the inlet valve 62 and the outlet valve 63 through locker arms 72 and 73, whereby the inlet and outlet are opened/closed. Moreover, the inlet port 60 is provided with an injector 74, which converts a fuel into fine particles and sprays them into the inlet port 60. Furthermore, an ignition plug 75 is attached to the cylinder head 52.

Incidentally, a cam chain tensioner 84 is attached to the side of the cylinder block 53, the cam chain tensioner 84 adjusting the tension of the timing chain 69 to open/close the inlet valve 62 and the outlet valve 63 with the cams 70 and 71.

In the engine 50 constituted as described above, an air/fuel mixture, where air cleaned by the air cleaner 22 and fuel injected by the injector 74 are mixed, is supplied to the combustion chamber 59 from the inlet port 60, compressed by the piston 56, ignited by the ignition plug 75, and then burned. In that way the air/fuel mixture is converted to energy for rotating the crankshaft 58 via the piston 56. Thereafter, exhaust gas generated is discharged from the exhaust port 61 to the outside.

The crankshaft 58 is constituted of a right crankshaft half 58a and a left crankshaft half 58b. A connecting rod 57 is connected to the crankshaft 58 through a crankpin 76, which is provided to connect the crankshaft halves 58a and 59a together. Moreover, the crankcase 54 which houses the crankshaft 58 is constituted of a right case half 54a and a left case half 54b. One end of the crankshaft 58 (the journal part of the right crankshaft half 58a) is supported by the right case half 54a with a bearing 77, whereas the other end of the crankshaft 58 (the journal part of the left crankshaft half 58b) is supported by the left case half 54b with a bearing 78. Moreover, an ACG 79 (alternating-current generator) and a cooling fan 85 are arranged at the tip of the journal part of the right crankshaft half 58a.

The left side of the left case half 54b extends in the rear direction to constitute a part of the transmission case 80, and the transmission 90 is housed in a transmission chamber 82 which is surrounded by a transmission cover 81 which is attached to the left side of the left case half 54b. The transmission 90 is constituted of a drive pulley 91, a counter shaft 92, a driven pulley 93, a clutch 94 and a transmission belt (not shown). The drive pulley 91 is attached to the tip of the journal part of the left crankshaft half 58b extending inside the transmission chamber 82 and rotates together with the left crankshaft half 58b. The counter shaft 92 is located in the rear of the transmission chamber 82 to extend in parallel with the crankshaft 58 and is rotatably attached to the transmission 90. The driven pulley 93 is attached at approximately the center of the counter shaft 92 so as to be relatively rotatable with the counter shaft 92. The clutch 94 is attached to the left end of the counter shaft 92 and connects/disconnects the driven pulley 93 to/from the countershaft 92. The transmission belt (not shown) may be wound around both the drive pulley 91 and the driven pulley 93 to transmit the rotation of the drive pulley 91 to the driven pulley 93.

The drive pulley 91 is constituted of a fixed pulley half 91a and a movable pulley half 91b. The fixed pulley half 91a is attached to the top of the crankshaft 58 so as to be rotatable together therewith. The movable pulley half 91b can move relatively to the fixed pulley half 91a in the axial direction of the crankshaft 58 and is rotatable with the crankshaft 58. The transmission belt can be held between the fixed pulley half 91a and the movable pulley half 91b. Meanwhile, the driven pulley 93 is constituted of a fixed pulley half 93a and a movable pulley half 93b. The fixed pulley half 93a is attached to the counter shaft 92 so as to be rotatable therewith. The movable pulley half 93b can move relatively to the fixed pulley half 93a in the axial direction of the crankshaft 58 and is relatively rotatable with the counter shaft 92. The transmission belt can be held between the fixed pulley half 93a and the movable pulley half 93b. Hence, by rendering the pulley widths of the drive pulley 91 and the driven pulley 93 adjustable, the loop radius of a transmission belt wound around both the pulleys 91 and 93 can be changed to control the gear ratio continuously.

A rear wheel shaft 96 to which an idle shaft 95 and the rear wheel 25 are attached is rotatably attached to the transmission 90 in parallel with the counter shaft 92. The driving force of the rotating counter shaft 92 is transmitted to the rear wheel 25 through gear series attached to the counter shaft 92, the idle shaft 95 and the rear wheel shaft 96. In this way the output from the engine 50 is transmitted to the crankshaft 58 and the rotational speed of the crankshaft 58 is changed in the transmission 90, followed by transmission to the rear wheel 25.

It should be noted that activation of the power unit 16 described above generates heat and so individual parts need to be cooled. For this reason, the cylinder head 52 is provided with a water jacket 122 inside which cooling water flows to cool the individual parts. A plurality of cooling fins 86, protruding to the outside, are provided at the sides of the cylinder block 53 for releasing heat generated in the cylinder block 53 to the outside. Moreover, a cooling air intake path 83, extending forwardly, is provided at the front of the transmission case 80 for the admission of outside air into the transmission chamber 82 for cooling.

Next, a secondary air supply system 100 will be described that is used for the scooter-type vehicle 1 configured as described above. The secondary air supply system 100 sends air to the exhaust port 61 to cause uncombusted components remaining in an exhaust gas from the combustion chamber 59 to burn again. The secondary air supply system 100 is constituted of a secondary air control valve 101, a lead valve 102, and first and second secondary air supply ducts 114 and 115 for connecting them together. The secondary air control valve 101 controls the flow of air supplied from the air cleaner 22. The lead valve 102 prevents the exhaust gas from flowing back into the secondary air control valve 101 and the like from the exhaust port 61, and opens to release exhaust gas due to the negative pressure generated in the exhaust port 61.

The secondary air control valve 101 has a secondary air suction pipe 103 and a secondary air discharge pipe 104. By opening/closing a solenoid valve provided in a main body 105, the flow of air is controlled which comes from the secondary air suction pipe 103 and discharges from the secondary air discharge pipe 104. Note that, electronic signals from an engine control unit (not shown) may be sent to the solenoid valve through a cable connected to a connector 106, whereby the solenoid valve is controlled. The secondary air control valve 101 is attached to the upper side of the cylinder block 53 with a bracket 117 attached to the main body 105, so that the secondary air control valve 101 may be disposed above the cylinder block 53. In addition the secondary air control valve 101 is flanked by the cam chain tensioner 84.

Figure 6:
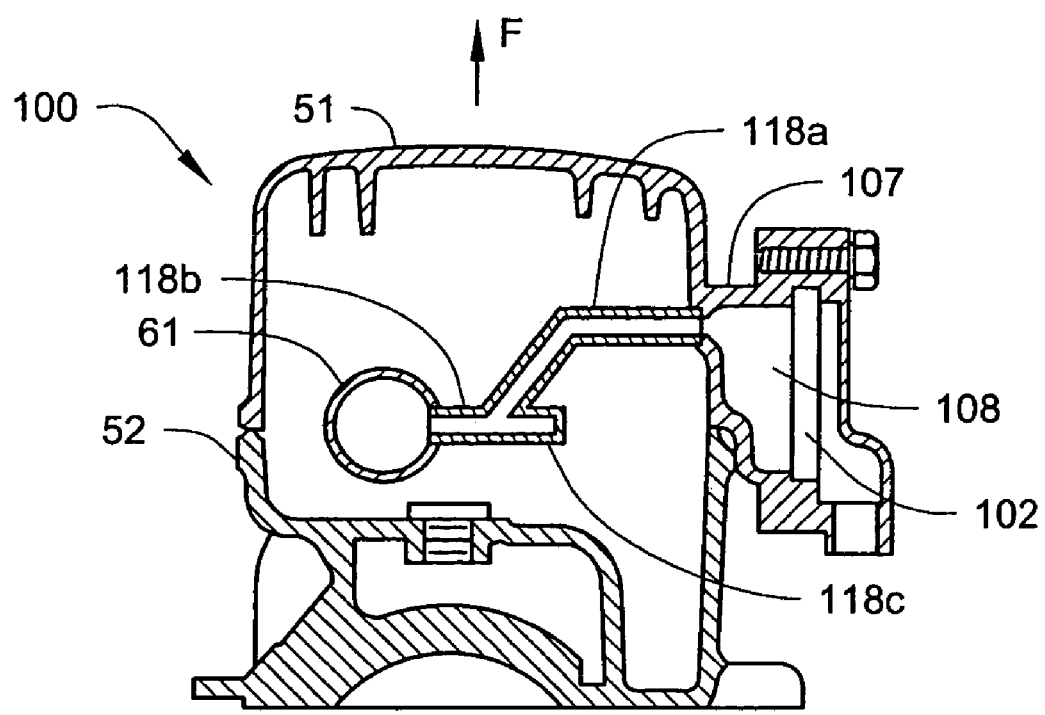
FIG. 6 represents a partial bottom sectional view of secondary air supply system in a cylinder head cover and cylinder head, showing one embodiment of an upper path and a lower path connecting a valve housing chamber to an exhaust port.

As shown in FIG. 6, a valve housing part 107, which protrudes to the outside, is formed on a side portion of the cylinder head cover 51, and a valve housing chamber 108 is formed to be surrounded by the valve housing part 107. An upper path 118a formed in the cylinder head cover 51 may communicate with the bottom of the valve housing chamber 108. Meanwhile, a lower path 118b is formed in the cylinder head 52 to communicate with the exhaust port 61, and includes a cap portion 118c. When the cylinder head cover 51 is attached to the cylinder head 52, the upper path 118a may communicate with the lower path 118b and thereby a path is formed through which secondary air is supplied to the exhaust port 61.

The lead valve 102 is attached to the upper portion of the valve housing chamber 108. At this point, the lead of the lead valve 102 may also be arranged on a side of the valve housing chamber 108. Then, a lead valve cover 109 is attached to the side of valve housing part 107 and the side of the lead valve 102. The lead valve cover 109 has an internal space 110, the rear side of which opens, and an air suction pipe 111 is formed to extend substantially parallel with the lead valve 102, to communicate with the internal space 110. Note that, the lead valve cover 109 is bolted to the cylinder head cover 51 at attachment parts 112 and 112 formed on the lead valve cover 109.

A secondary air supply pipe 113 for discharging air that has been cleaned by the cleaner 22 is formed on the front of the air cleaner 22. The secondary air supply pipe 113 and the secondary air suction pipe 103 of the secondary air control valve 101 are connected to each other with the first secondary air supply duct 114. In addition, the secondary air discharge pipe 104 of the secondary air control valve 101 and the air suction pipe 111 formed on the lead valve cover 109 are connected to each other with the second secondary air supply duct 115.

In the engine 50 configured as described above, air that has been cleaned by the air cleaner 22 passes through the first secondary air supply duct 114, the secondary air control valve 101 and the second secondary air supply duct 115, is introduced into the internal space 110 of the lead valve cover 109 from the air suction pipe 111, enters the valve housing chamber 108 by pushing down the lead of the lead valve 102, and is supplied to the exhaust port 61 after passing through the upper path 118a and the lower path 118b. Note that, the engine control unit may control the opening/closing of the secondary air control valve 101 according to a particular vehicle state of the scooter-type vehicle 1, such as the vehicle speed, the rotational speed of an engine, the throttle position and the like. Moreover, the lead valve 102 is attached to the valve housing chamber 108 so that its lead may be disposed inside the valve housing chamber 108. Accordingly, even if the pressure inside the exhaust port 61 is increased, such as when supplied secondary air causes uncombusted components present in the exhaust port 61 to burn again, the exhaust gas generated does not flow back to the secondary air control valve 101 and the like.

Figure 3:
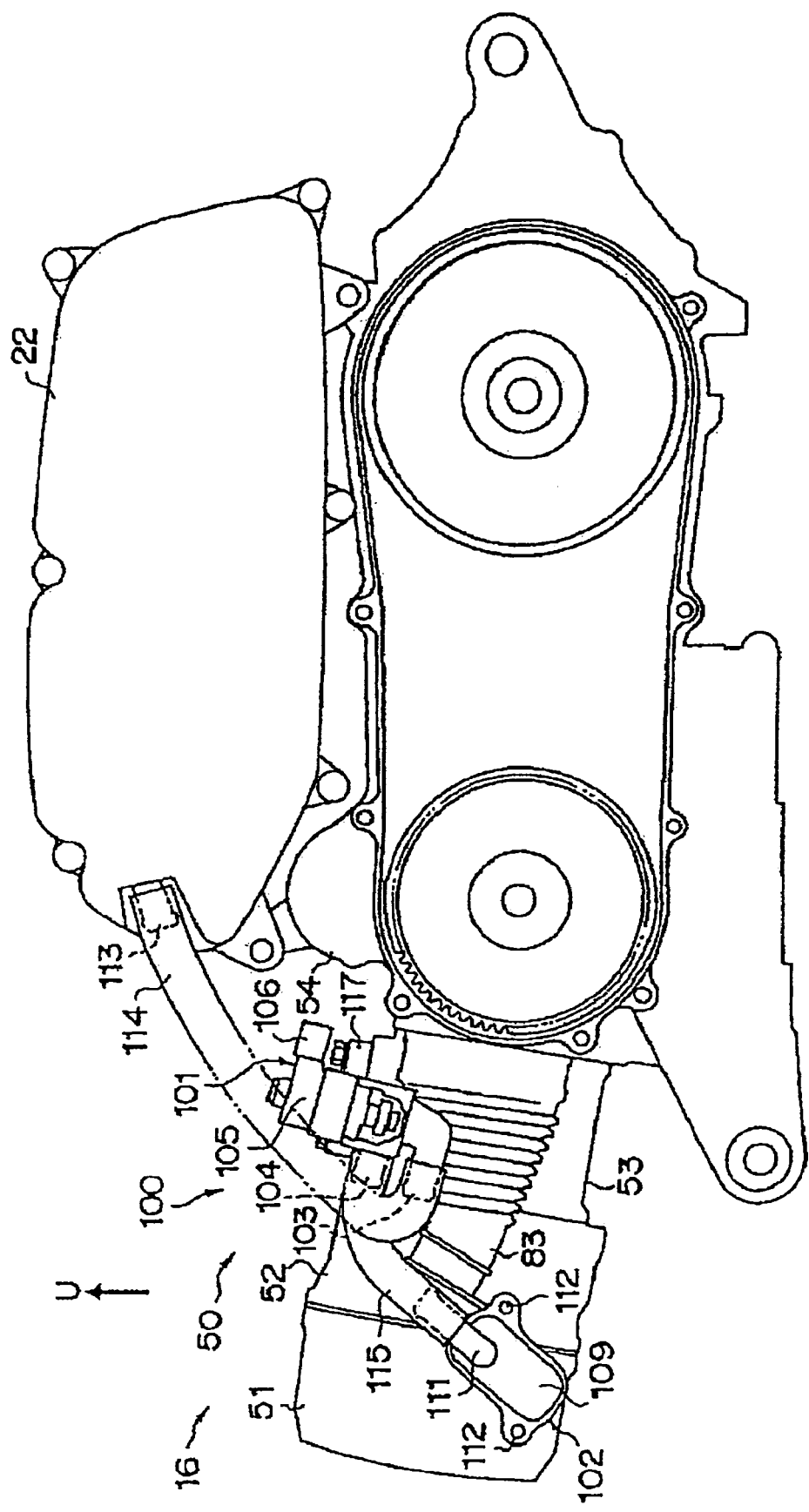
FIG. 3 is a left side view of the power unit.
Figure 4:
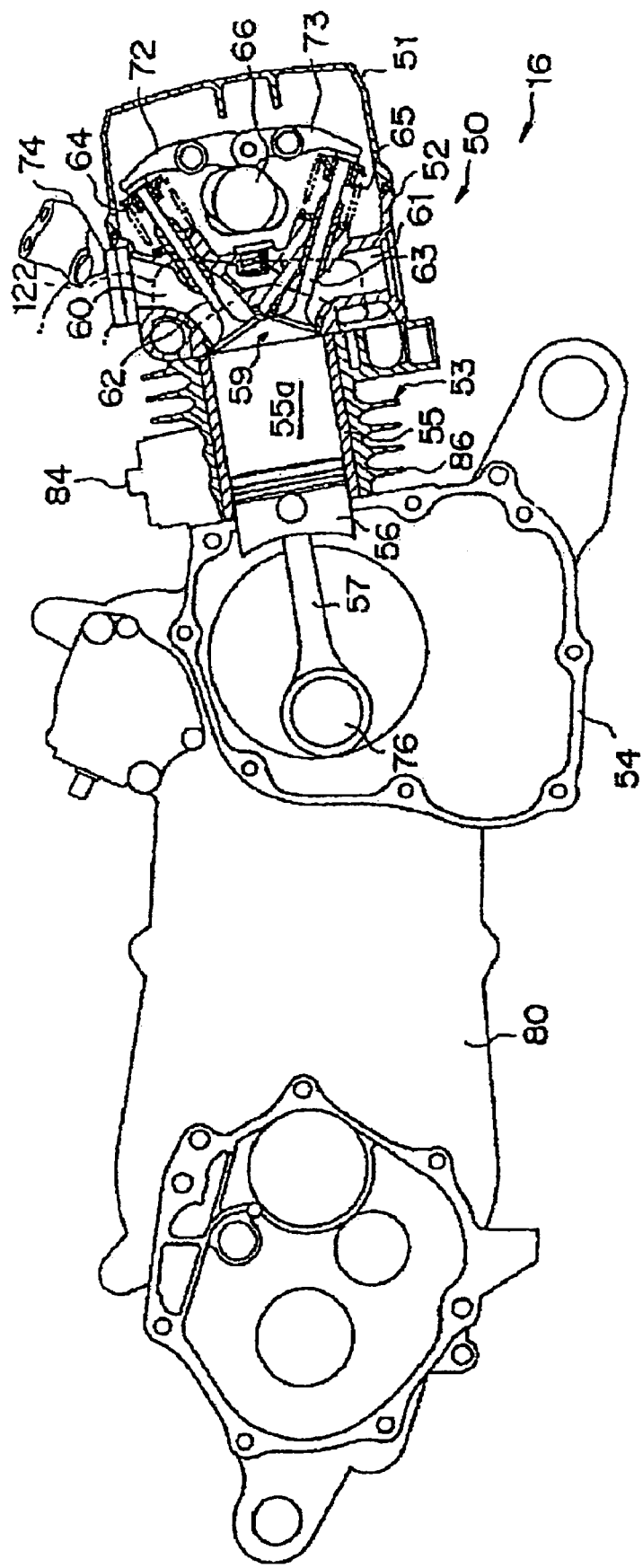
FIG. 4 is a right side view of the power unit.

As can be seen from FIG. 3, the air cleaner 22, secondary air supply pipe 113, the secondary air control valve 101 and the lead valve 102 are arranged in such a way that they are substantially on a same straight line when viewed from the side. For this reason, it is easy to reduce the lengths of the first and second secondary air supply ducts 114 and 115 (hereinafter, collectively referred to as "secondary air supply paths"), which connect these members together, and hence it is possible to make the secondary air supply system 100 compact and lightweight as well as to reduce the manufacturing cost. In addition, as can be seen from FIG. 2, the air cleaner 22, secondary air supply pipe 113, the secondary air control valve 101 and the lead valve 102 are arranged on one side (left side) of the engine 50 along the cylinder axis, so that they are substantially on a same straight line even when viewed from the top. With this arrangement, the attachment of the secondary air supply ducts 114 and 115 can be performed from one side of the engine 50, thus facilitating connection operations. It should be noted that it is possible to reduce the lengths of the secondary air supply ducts 114 and 115 and thereby to facilitate the connection operations by arranging them on the straight line running through the air cleaner 22, the secondary air control valve 101 and the lead valve 102.

As can be seen from FIG. 3, since the secondary air control valve 101 is arranged above the cooling air intake path 83 which allows outside air to enter the transmission case 80, the secondary air control valve 101 is also likely to be exposed to outside air (cooling air). Thus, it is possible to keep the secondary air control valve 101 at an appropriate temperature. Furthermore, since the secondary air control valve 101 is attached to the side of the cylinder block 53 with the bracket 117 and is flanked by the cam chain tensioner 84, heat from the engine 50 can be blocked by the cam chain tensioner 84 and hence it is possible to keep the secondary air control valve 101 at a more appropriate temperature.

Note that, if the crankcase 54 adopts a structure that can be divided into right and left parts in the direction in which the crankshaft 58 extends as shown in this embodiment, the attachment of the secondary air control valve 101 to the crankcase 54 becomes difficult. However, since the secondary air control valve 101 is attached to the cylinder block 53 with the bracket 117 as described above, the secondary air control valve 101 can be readily attached to the crankcase 54.

Figure 5:
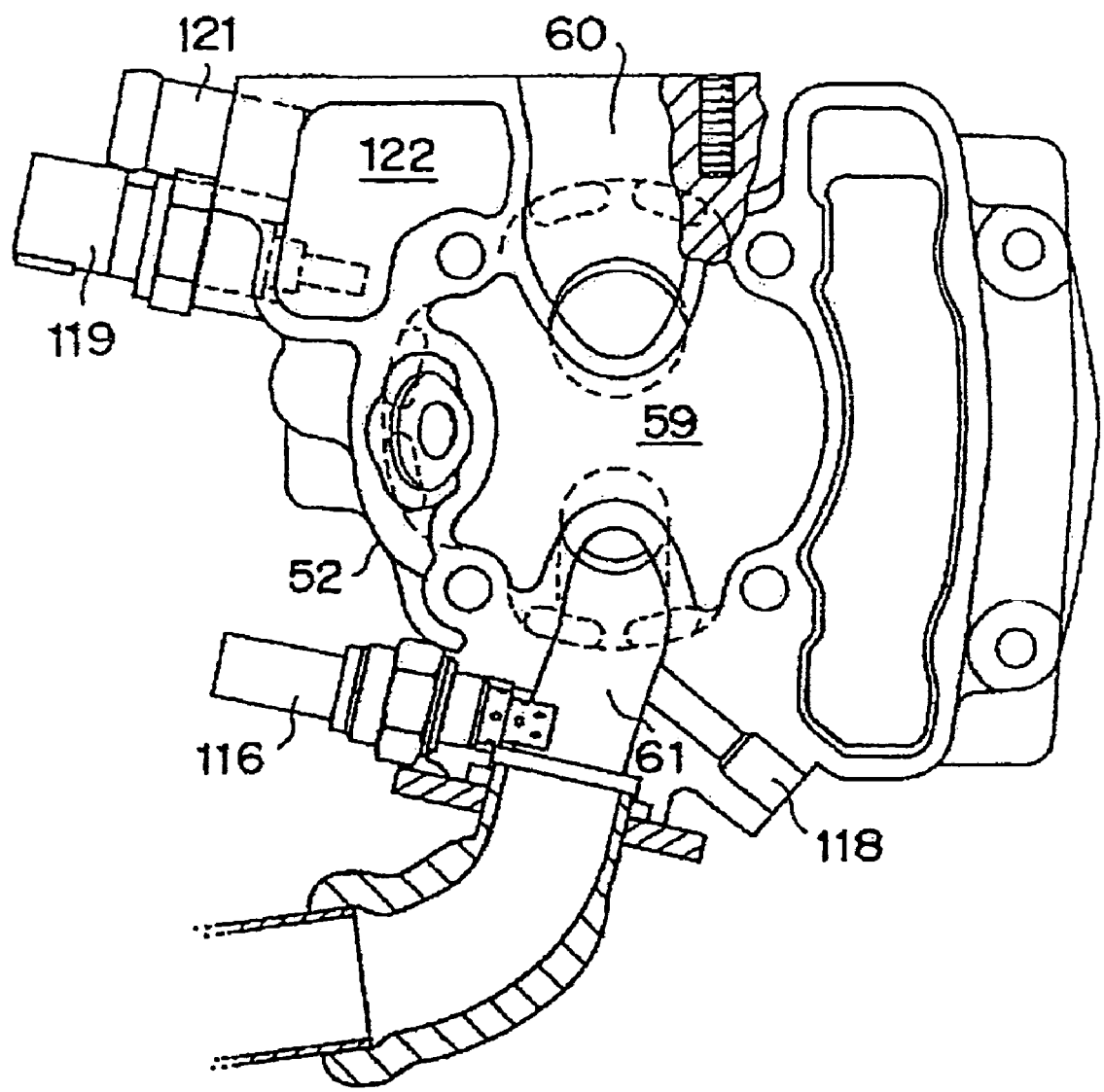
FIG. 5 is a cross-sectional view of one embodiment of a cylinder head.

Incidentally, an $O_2$ sensor 116 and a water temperature sensor 119 are attached to the engine 50 shown in this embodiment. The $O_2$ sensor 116 determines the oxygen concentration of the exhaust gas in the exhaust port 61. The water temperature sensor 119 measures the temperature of the cooling water present in a cooling water-draining pipe 121 for draining the cooling water that has been used to cool the cylinder head 52 from the water jacket 122, and measures the temperature of the cooling water present in the water jacket 122. As shown in FIG. 5, the direction in which these sensors 116 and 119 are attached to the engine 50 and the direction in which the cooling water-draining pipe 121 extends are substantially the same and are substantially parallel with each other when viewed from the top. For this reason, the attachment of these sensors 116 and 119 to the engine 50 and the attachment of the cooling water-draining pipe 121 to a cooling water-draining duct (not shown) can be performed from one side of the engine, thereby facilitating attachment operations.

What is claimed is:

1. A secondary air supply system provided between an air cleaner attached to an engine and an exhaust port of the engine to supply air from the air cleaner to the exhaust port, the secondary air supply system comprising:
   a secondary air supply pipe configured to be in direct contact with the air cleaner;
   a secondary air control valve coupled to the secondary air supply pipe via a first secondary air supply duct; and
   a lead valve configured to be coupled to the exhaust port of the engine, the lead valve coupled to the secondary air control valve via a second secondary air supply duct;
   wherein the secondary air supply pipe, the secondary air control valve, and the lead valve are arranged to be disposed on a substantially same straight line when viewed from the side, and
   wherein, from a side view, the secondary air control valve is disposed above a cylinder of the engine and directly above a cooling air intake path which extends forwardly from a front of a transmission case of the engine.

2. The secondary air supply system according to claim 1, wherein the secondary air supply pipe, the secondary air control valve and the lead valve are arranged on one side of the engine along an engine cylinder axis and are disposed on a substantially same straight line when viewed from the top.

3. The secondary air supply system according to claim 1, wherein the first and second secondary air supply ducts are each arranged to be disposed on the straight line that runs through the secondary air supply pipe, the secondary air control valve and the lead valve when viewed from the side.

4. The secondary air supply system according to claim 1, wherein a cam chain tensioner is arranged on a top surface of the engine cylinder, the cam chain tensioner being arranged to flank the secondary air control valve.

5. The secondary air supply system according to claim 1, further comprising a two-wheeled vehicle.

* * * * *